United States Patent
Miller et al.

(10) Patent No.: US 11,524,636 B2
(45) Date of Patent: Dec. 13, 2022

(54) INTERNALLY DAMPED CROSSBAR ASSEMBLY HAVING A SLIP PLATE DAMPER

(71) Applicant: Raytheon Company, Waltham, MA (US)

(72) Inventors: Kirk A. Miller, Dallas, TX (US); Sean G. Thomas, McKinney, TX (US)

(73) Assignee: Raytheon Company, Waltham, MA (US)

( * ) Notice: Subject to any disclaimer, the term of this patent is extended or adjusted under 35 U.S.C. 154(b) by 536 days.

(21) Appl. No.: 16/721,792

(22) Filed: Dec. 19, 2019

(65) Prior Publication Data

US 2021/0190171 A1 Jun. 24, 2021

(51) Int. Cl.
| | |
|---|---|
| *B60R 11/04* | (2006.01) |
| *F16F 7/08* | (2006.01) |
| *F16F 15/02* | (2006.01) |
| *G01D 11/10* | (2006.01) |

(52) U.S. Cl.
CPC ............... *B60R 11/04* (2013.01); *F16F 7/08* (2013.01); *F16F 15/02* (2013.01); *G01D 11/10* (2013.01); *F16F 2230/0047* (2013.01)

(58) Field of Classification Search
CPC .. B60R 11/04; F16F 7/08; F16F 15/02; G01D 11/10
See application file for complete search history.

(56) References Cited

U.S. PATENT DOCUMENTS

| | | |
|---|---|---|
| 704,403 A | 7/1902 | Thill |
| 1,824,085 A | 9/1931 | Karnes et al. |
| 2,378,744 A | 6/1945 | Annen |
| 3,385,542 A | 5/1968 | Enemark et al. |

(Continued)

FOREIGN PATENT DOCUMENTS

| | | |
|---|---|---|
| CN | 100585052 C | 1/2010 |
| EP | 2798314 A1 | 11/2014 |

(Continued)

OTHER PUBLICATIONS

International Search Report for International Application No. PCT/US2020/056126 dated Feb. 3, 2020, 10 pages.

(Continued)

*Primary Examiner* — Jamel E Williams

(57) ABSTRACT

A crossbar system for facilitating isolation of a sensor assembly from external vibrations of a support structure. The crossbar system comprises first and second crossbar assemblies and a payload mount, Each of the first and second crossbar assemblies comprises a crossbar segment and a slip plate damper. Each crossbar segment comprises a payload mount interface at a first end of the crossbar assembly and a first support structure interface at a second end of the crossbar assembly. Each slip plate damper is disposed about the crossbar segment and is slidably coupled to the crossbar segment to constrain movement in two lateral degrees of freedom and to facilitate movement in a longitudinal degree of freedom, Each slip plate damper comprises a second support structure interface at the second end of the crossbar assembly. The payload mount is coupled to the payload mount interfaces of the first and second crossbar assemblies.

20 Claims, 9 Drawing Sheets

(56) References Cited

U.S. PATENT DOCUMENTS

| | | | |
|---|---|---|---|
| 3,773,285 A | 11/1973 | Morrill | |
| 4,318,522 A | 3/1982 | Appleberry | |
| 4,341,452 A | 7/1982 | Korling | |
| 4,498,038 A * | 2/1985 | Malueg | B64D 47/08 |
| | | | 89/41.09 |
| 4,625,938 A | 12/1986 | Brown | |
| 4,669,843 A | 6/1987 | Bozzolato | |
| 5,184,521 A * | 2/1993 | Tyler | G01C 21/18 |
| | | | 74/5.22 |
| 5,368,271 A * | 11/1994 | Kiunke | F16F 15/02 |
| | | | 248/187.1 |
| 5,897,223 A * | 4/1999 | Tritchew | G02B 27/644 |
| | | | 348/144 |
| 6,003,829 A | 12/1999 | Martinsson | |
| 6,454,229 B1 | 9/2002 | Voigt et al. | |
| 6,484,978 B2 | 11/2002 | Voigt et al. | |
| 7,000,883 B2 | 2/2006 | Mercadal et al. | |
| 7,324,747 B2 * | 1/2008 | Kempas | B64C 1/36 |
| | | | 244/129.1 |
| 7,561,784 B2 | 7/2009 | Wescott et al. | |
| 7,699,691 B1 | 4/2010 | Voigt et al. | |
| 8,100,377 B1 | 1/2012 | Blackburn | |
| 8,844,896 B2 | 9/2014 | Pettersson | |
| 9,348,197 B2 | 5/2016 | Lewis | |
| 9,765,925 B2 | 9/2017 | Lewis | |
| 10,906,636 B2 | 2/2021 | Welsh et al. | |
| 2002/0158181 A1 | 10/2002 | Carter et al. | |
| 2002/0158182 A1 | 10/2002 | Carter et al. | |
| 2005/0031335 A1 | 2/2005 | Itzkowitz | |
| 2008/0158371 A1 | 7/2008 | Trescott | |
| 2009/0148150 A1 | 6/2009 | Valles Navarro et al. | |
| 2009/0216394 A1 | 8/2009 | Heppe et al. | |
| 2010/0234844 A1 | 9/2010 | Edelhauser et al. | |
| 2014/0176717 A1 | 6/2014 | De Paschoal | |
| 2016/0139494 A1 | 5/2016 | Tien et al. | |
| 2017/0175948 A1 | 6/2017 | Zeise et al. | |
| 2018/0004064 A1 | 1/2018 | Kim | |
| 2020/0173511 A1 | 6/2020 | Miller et al. | |
| 2020/0307826 A1 | 10/2020 | Zhang et al. | |
| 2021/0188187 A1 | 6/2021 | Miller | |
| 2021/0190170 A1 | 6/2021 | Miller et al. | |
| 2021/0190171 A1 | 6/2021 | Miller et al. | |
| 2021/0190263 A1 | 6/2021 | Thomas | |

FOREIGN PATENT DOCUMENTS

| | | |
|---|---|---|
| EP | 3220006 A1 | 9/2017 |
| JP | 2000-214745 A | 8/2000 |
| JP | 2002-154491 A | 5/2002 |
| JP | 5090293 B2 | 12/2012 |
| KR | 101362926 B1 | 2/2014 |
| KR | 101979293 B1 | 5/2019 |
| WO | WO 1996/02770 A1 | 2/1996 |
| WO | WO 2015/149079 A1 | 10/2015 |
| WO | WO 2017/179160 A1 | 10/2017 |

OTHER PUBLICATIONS

International Search Report for International Application No. PCT/US2020/056135 dated Feb. 11, 2020, 14 pages.

International Search Report for International Application No. PCT/US2020/056155 dated Feb. 23, 2021, 32 pages.

International Search Report for International Application No. PCT/US2020/056167 dated Feb. 12, 2021, 15 pages.

Leonardo DRS, Mast Muonted Sight (MMS), https://www.leonardodrs.com/media/3296/mms_datasheet.pdf, to the best of applicant's Knowledge article was available before the application filing date, 2 pages, Melbourne, Florida.

International Search Report for International Application No. PCT/US2020/056148 dated Feb. 16, 2021, 14 pages.

* cited by examiner

INTERNALLY DAMPED CROSSBAR ASSEMBLY HAVING A SLIP PLATE DAMPER

BACKGROUND

Sensors, such as imaging sensors, can be mounted to mobile vehicles, such as aircraft, land vehicles, and watercraft using a payload system mount rotatably coupled to the vehicle. The payload system mount with its rotatable coupling can include at least two rotating joints. For example, a first rotating joint can allow azimuth rotation of the payload system mount while a second rotating joint coupled to the first rotating joint can allow elevational rotation of the payload system mount. A crossbar system can be coupled to the payload system mount and can support a sensor assembly (e.g., an imaging assembly or system) in isolation. The sensor assembly can be mounted at a central location of the crossbar system and a first and second end of the crossbar system can be coupled to the payload system mount. Thus, the first rotating joint can be configured to facilitate azimuth rotation of the sensor assembly, and the second rotating joint can be configured to facilitate elevational rotation of the sensor assembly.

The crossbar system is configured to transmit motion of the payload system mount to the sensor assembly. However, it is not desirable to transmit all motion to the sensor assembly. For example, sensors can be sensitive to vibration and sudden acceleration (e.g., due to shock or other loads) and can experience a loss of resolution when subjected to these. For example, vehicles experience accelerations and vibrations during operation that can be detrimental to the functioning of the sensor. These accelerations and vibrations, if not isolated and damped, can be transmitted from the vehicle through the payload mount system to the sensor assembly and the sensor payload.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
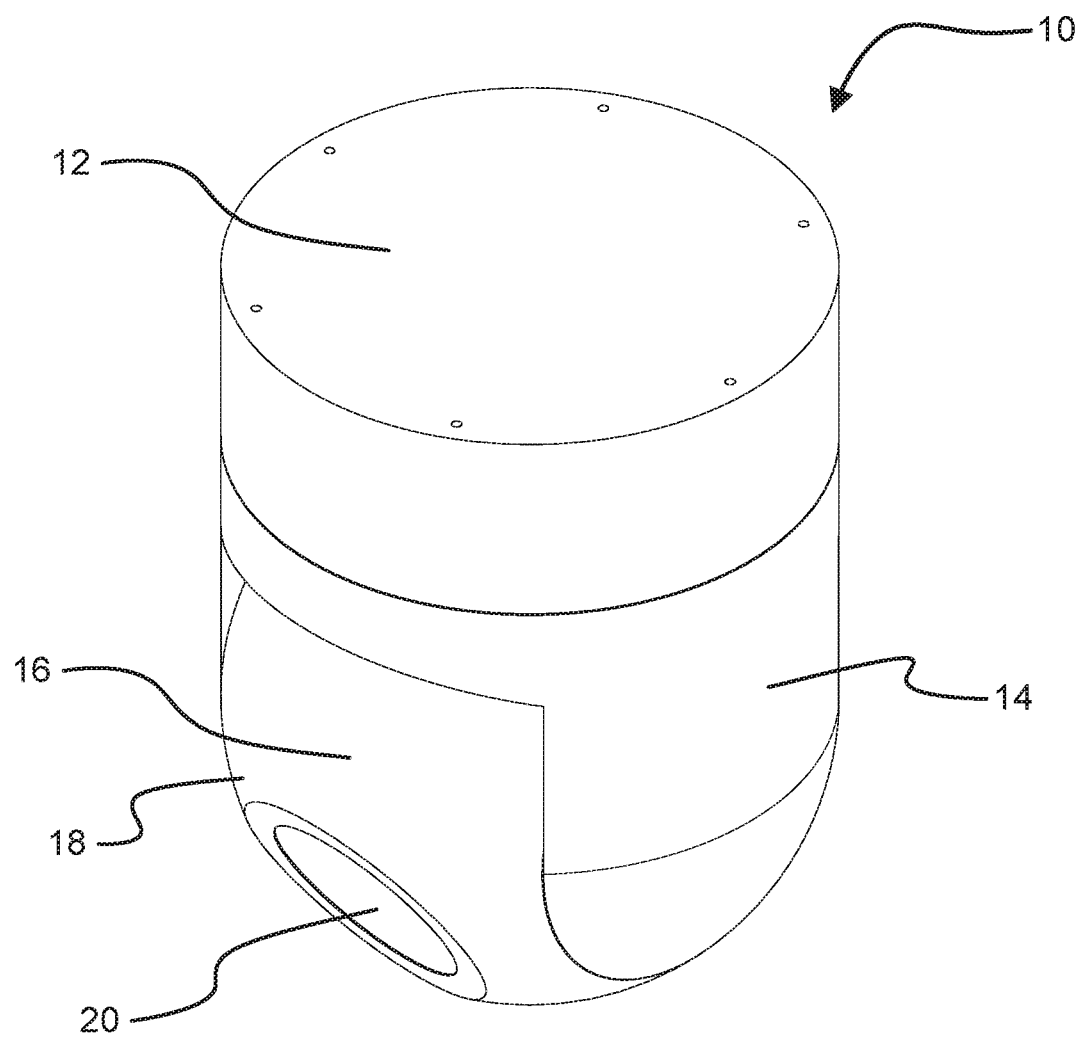
FIG. 1 illustrates an isometric view of a payload mounting system in accordance with an example of the present disclosure.

Reference will now be made to the examples illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

In one example, disclosed is a crossbar system for facilitating isolation of a sensor assembly from external vibration of a structure. The crossbar system comprises first and second crossbar assemblies and a payload mount. Each crossbar assembly comprises a crossbar segment and a slip plate damper. Each crossbar segment comprises a payload mount interface at a first end of the crossbar assembly and a first support structure interface at a second end of the crossbar assembly opposing the first end. Each slip plate damper is disposed about the crossbar segment and slidably coupled to the crossbar segment to constrain movement in two lateral degrees of freedom and to facilitate movement in a longitudinal degree of freedom. Each slip plate damper comprises a second support structure interface at the second end of the crossbar assembly. The payload mount is coupled to the payload mount interfaces of the first and second crossbar assemblies and is operable to mount a sensor assembly.

In accordance with a more detailed aspect, each crossbar assembly can further comprise a flexible plate supported by the crossbar segment of each crossbar assembly and the flexible plate can define the support structure interface of each crossbar segment.

In accordance with a more detailed aspect, each slip plate damper can comprise a plurality of elongate plates extending from the second support interface and the crossbar segment can comprise an elongate bar extending from the payload mount interface. The plurality of elongate plates can be arranged about the elongate bar.

In accordance with a more detailed aspect, each of the elongate plates of the plurality of elongate plates can comprise a plurality of axially spaced holes and the elongate bar can comprise a plurality of axially spaced slots corresponding to the plurality of axially spaced holes of an elongate plate.

In accordance with a more detailed aspect, each crossbar assembly can further comprise a plurality of fasteners biasing each of the elongate plates towards the elongate bar.

In accordance with a more detailed aspect, the elongate bar can have a length greater than a length of each of the plurality of elongate plates.

Also disclosed is a crossbar assembly for facilitating isolation of a sensor assembly from external vibration of a payload system mount on a vehicle. The crossbar assembly comprises a crossbar segment and a slip plate damper. The crossbar segment comprises a payload mount interface at a first end of the crossbar assembly and a first support structure interface at a second end of the crossbar assembly opposing the first end. The slip plate damper is disposed about the crossbar segment to constrain movement in two lateral degrees of freedom and facilitates movement in a longitudinal degree of freedom. The slip plate damper comprises a second support structure interface at the second end of the crossbar assembly. The first support structure interface facilitates longitudinal movement of the crossbar segment relative to a support structure and the second support structure interface dampens movement of the crossbar segment relative to the support structure.

In accordance with a more detailed aspect, the crossbar assembly can further comprise a flexible plate supported by the crossbar segment with the flexible plate defining the support structure interface.

In accordance with a more detailed aspect, the crossbar assembly can further comprise at least one fastener, the crossbar segment can comprise a plurality of axially spaced slots, and the slip plate damper can comprise a corresponding plurality of holes. The at least one fastener can extend through a hole of the plurality of holes and a corresponding slot of the plurality of axially spaced slots.

In accordance with a more detailed aspect, the crossbar segment can comprise an elongate bar and the slip plate damper can comprise a plurality of elongate plates.

In accordance with a more detailed aspect, the elongate bar can have a square cross section and the plurality of elongate plates can comprise four elongate plates.

In accordance with a more detailed aspect, the second support structure interface can comprise a lateral extension of an elongate plate of the plurality of elongate plates.

In accordance with a more detailed aspect, the crossbar segment can comprise an axial protrusion configured to interface with a complementary aperture of the flexible plate.

In accordance with a more detailed aspect, the axial protrusion can have a keyed profile and the aperture can have a complementary keyed profile.

Also disclosed is a payload system mount for mounting to a vehicle. The payload system mount can comprise a base structure, a support structure rotatably coupled to the base structure, a crossbar system supported by the support structure, and a sensor assembly coupled to the payload mount. The crossbar system can comprise first and second crossbar assemblies and a payload mount. Each crossbar assembly can comprise a crossbar segment and a slip plate damper. Each crossbar segment can comprise a payload mount interface at a first end of the crossbar assembly and a first support structure interface at a second end of the crossbar assembly opposing the first end. Each slip plate damper can be disposed about the crossbar segment and slidably coupled to the crossbar segment to constrain movement in two lateral degrees of freedom, and to facilitate movement in a longitudinal degree of freedom. The slip plate damper can comprise a second support structure interface at the second end of the crossbar assembly. The payload mount can be coupled to the payload mount interfaces of the first and second crossbar assemblies, and is operable to mount a sensor assembly. The sensor assembly can be coupled to the payload mount and can comprise at least one sensor.

In accordance with a more detailed aspect, each crossbar assembly can further comprise a flexible plate supported by the crossbar segment and the flexible plate can define the support structure interface.

In accordance with a more detailed aspect, each slip plate damper can comprise a plurality of elongate plates extending from the second support interface, and each crossbar segment can comprise an elongate bar extending from the first payload mount interface. The plurality of elongate plates can be arranged about the elongate bar.

In accordance with a more detailed aspect, each of the elongate plates can comprise a plurality of axially spaced holes and the elongate bar can comprise a plurality of axially spaced slots corresponding to the plurality of axially spaced holes of an elongate plate.

In accordance with a more detailed aspect, each crossbar assembly can further comprise a plurality of fasteners biasing each of the elongate plates towards the elongate bar.

Figure 2:
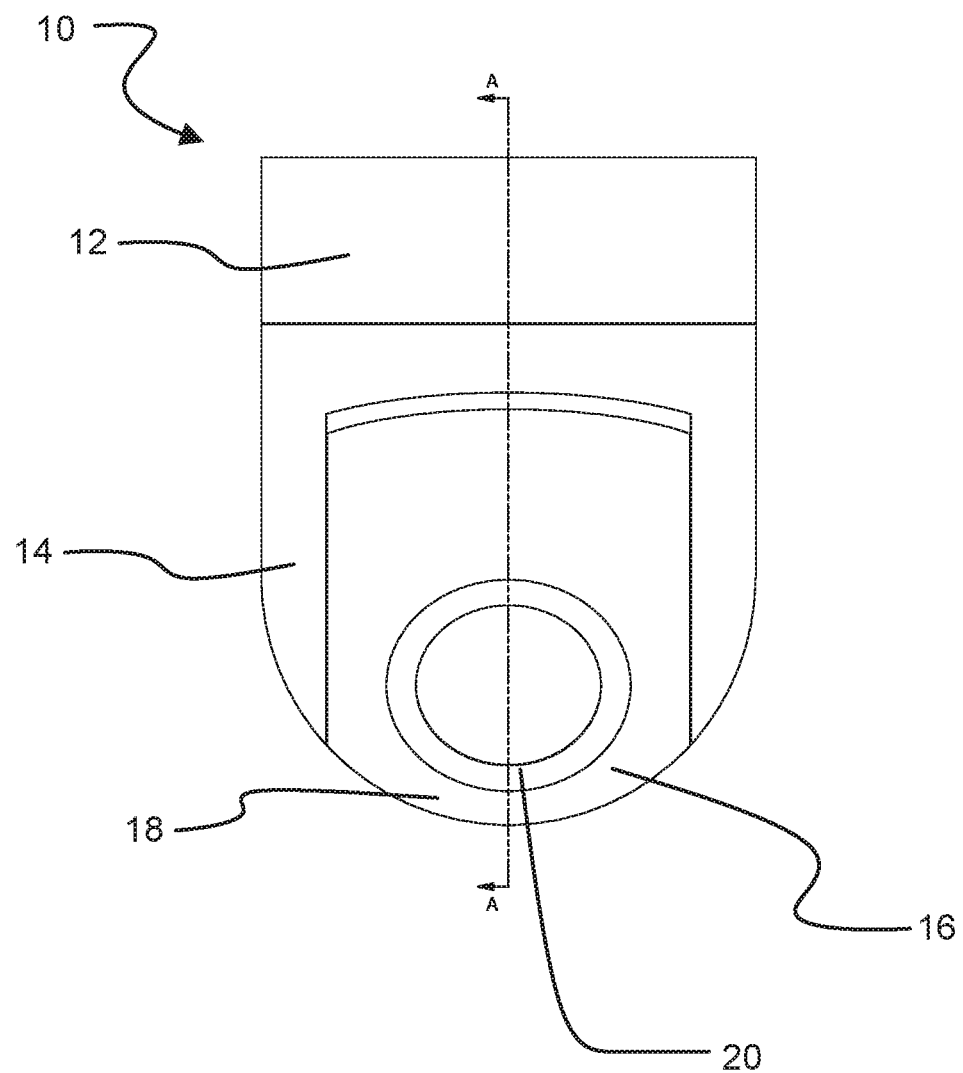
FIG. 2 illustrates a front view of the payload mounting system of FIG. 1.

To further describe the present technology, examples are now provided with reference to the figures. FIG. 1 illustrates an isometric view of a payload system mount 10 in accordance with an example of the present disclosure and FIG. 2 illustrates a front view of the payload system mount 10 of FIG. 1. With reference to FIGS. 1 and 2, the exemplary payload system mount 10 can comprise a turret mounted to a vehicle, and that is operable to support a payload, such as a sensor assembly having a sensor (e.g., an imaging sensor (e.g., a camera)), wherein the payload is supported by a crossbar system (discussed below). The turret can comprise a base 12 which can be coupled to the vehicle. A coarse azimuth platform 14 can be rotatably coupled to the base 12, and a coarse elevation platform 16 can be rotatably coupled to the coarse azimuth platform 14. The coarse elevation platform 16 can include a shell 18, which can house the payload in the form of the sensor assembly, including the sensor, and a crossbar system suspending and isolating the sensor assembly payload. A window 20 can be positioned at an outer surface of the shell 18 and provides transparent access to the sensor assembly, as well as facilitates a field of view of the sensor assembly through the payload system mount 10. For example, the sensor assembly can include a visual sensor, and the window 20 can be configured to be transparent to visible light. In another example, the sensor assembly can include a thermal radiation sensor, and the window 20 can be configured to be transparent to infrared radiation. In addition, the visual sensor, as mounted within the payload system mount 10, can be configured to sense or image objects through the window 20 that are within its field of view.

The payload system mount 10, and particularly the base 12, can be mounted or coupled to the vehicle using conventional techniques, such as bolted fasteners, weldments, or any other means as will be appreciated by those skilled in the art. Although the payload system mount 10 of FIGS. 1 and 2 is shown extending downward, in other examples the payload system mount 10 can be mounted so as to extend laterally or upward. The coarse azimuth platform 14 can be rotatably coupled to the base 12. For example, the coarse azimuth platform 14 can have a turntable type mount (not shown) rotatably coupling the coarse azimuth platform 14 to the base 12. In the example of FIGS. 1 and 2, the turntable mount can effectuate relative movement between the coarse azimuth platform 14 and the base 12 about a substantially vertical axis providing azimuthal rotation. The coarse azimuth platform 14 can be actuated using common actuators, such as electric actuators, hydraulic actuators, and others as will be appreciated and apparent to those skilled in the art.

The coarse elevation platform 16 can be rotatably coupled to the coarse azimuth platform 14. The coarse elevation platform 16 can be coupled or mounted to the coarse azimuth platform 14 by a rotating joint to effectuate movement between the coarse elevation platform 16 and the coarse azimuth platform 14. In the example of FIG. 1, the coarse elevation platform 16 can rotate relative to the coarse azimuth platform 14 about an axis that is substantially perpendicular to the axis of rotation of the coarse azimuth platform 14 relative to the base 12. For example, when the coarse azimuth platform 14 rotates about a vertical axis (from the perspective shown in FIGS. 1 and 2), the coarse elevation platform 16 can rotate about a horizontal axis.

Although FIGS. 1 and 2 illustrate the payload system mount 10 as comprising a turret type of payload system mount, this is not intended to be limiting in any way. Indeed, those skilled in the art will recognize other types of payload system mounts in which the crossbar system described herein can be used and supported for isolating a payload supported by the crossbar system. For example, the payload mount system can be incorporated in a pod type mount in which a coarse roll platform is rotatably coupled to a vehicle to rotate about a roll axis.

Figure 3:
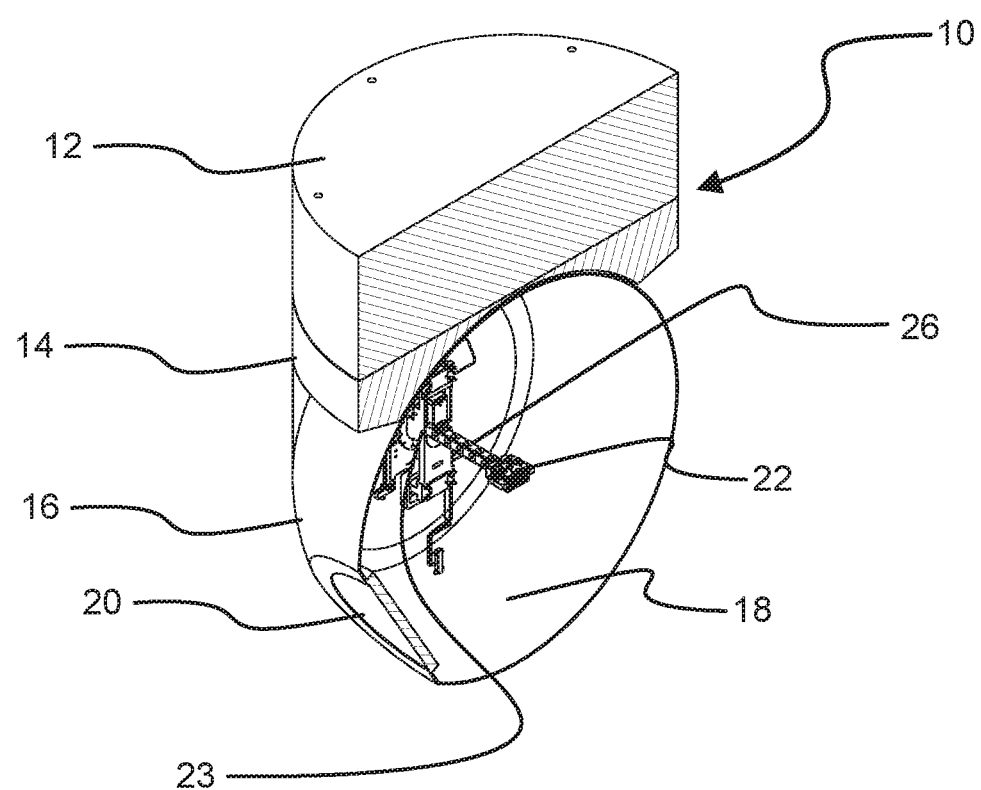
FIG. 3 illustrates an isometric, cross-sectional view of the payload mounting system of FIG. 1, taken along line AA of FIG. 2.

FIG. 3 illustrates a cross section of the payload system mount 10 of FIGS. 1 and 2, taken along line AA of FIG. 2. As shown, the payload system mount 10 can comprise a base structure, such as coarse azimuth platform 14, a support structure such as coarse elevation platform 16, and a crossbar system 26 in support of a payload mount 22. The crossbar system 26 can be coupled to the support structure of the payload system mount 10 such that rotation of the support structure relative to the base structure results in rotation of the crossbar system 26 and in turn a sensor assembly (and sensor) coupled or mounted to the payload mount 22. In some examples, the crossbar system 26 can be coupled to the coarse elevation platform 16 using conventional fastening techniques, such as threaded fasteners, adhesives, weldments, and others. The crossbar system 26 can span a measured distance (e.g., width) of the coarse elevation platform 16, such that the crossbar system 26 is suspended only at the distal ends 23 of the crossbar system 26.

Figure 4:
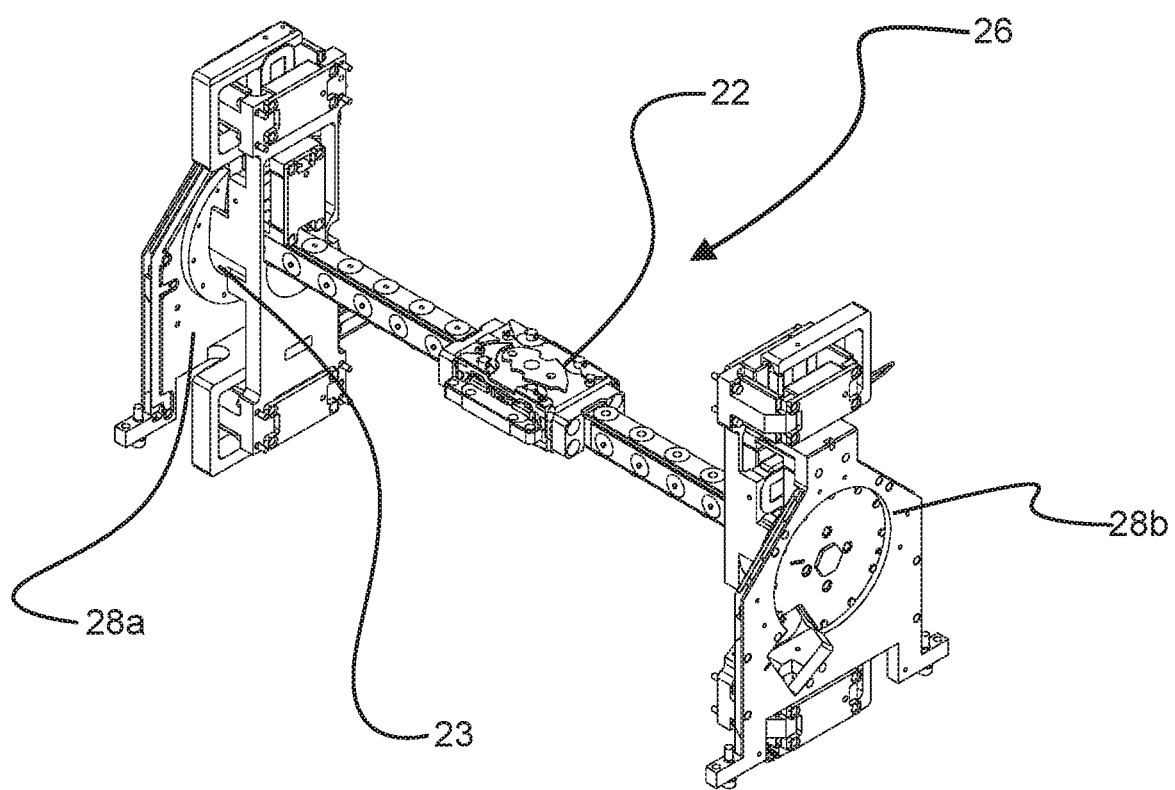
FIG. 4 illustrates an isometric view of the crossbar system and a support structure of the payload mounting system of FIG. 1.

FIG. 4 illustrates the crossbar system 26 and first and second portions 28a, 28b of the support structure. The first and second portions 28a, 28b can be a component of the coarse elevation platform 16 of FIG. 3. In some examples, the support structure, including first and second portions 28a, 28b, can rotate with the coarse elevation platform 16. Thus, rotation of the coarse elevation platform 16 can cause the crossbar system 26 to rotate. Additionally, vibrations of a vehicle may be transmitted to the support structure. For example, referring to FIG. 1, vehicle vibrations can be transmitted from a vehicle to the base 12, from the base 12 to the coarse azimuth platform 14, from the coarse azimuth platform 14 to the coarse elevation platform 16, and from coarse elevation platform 16 to the crossbar system 26. Thus, the crossbar system 26 can experience vibrations at each distal end 23 where the crossbar system 26 mounts to the first and second portions 28a, 28b of the support structure. As will be described in greater detail below, the crossbar system 26 facilitates isolation of the sensor assembly mounted to the payload mount 22 from external vibrations propagating from the support structure and through the crossbar system 26, such that the external vibrations are damped, thus having little or no effect on the payload mount 22 and the payload mounted thereto.

Figure 5:
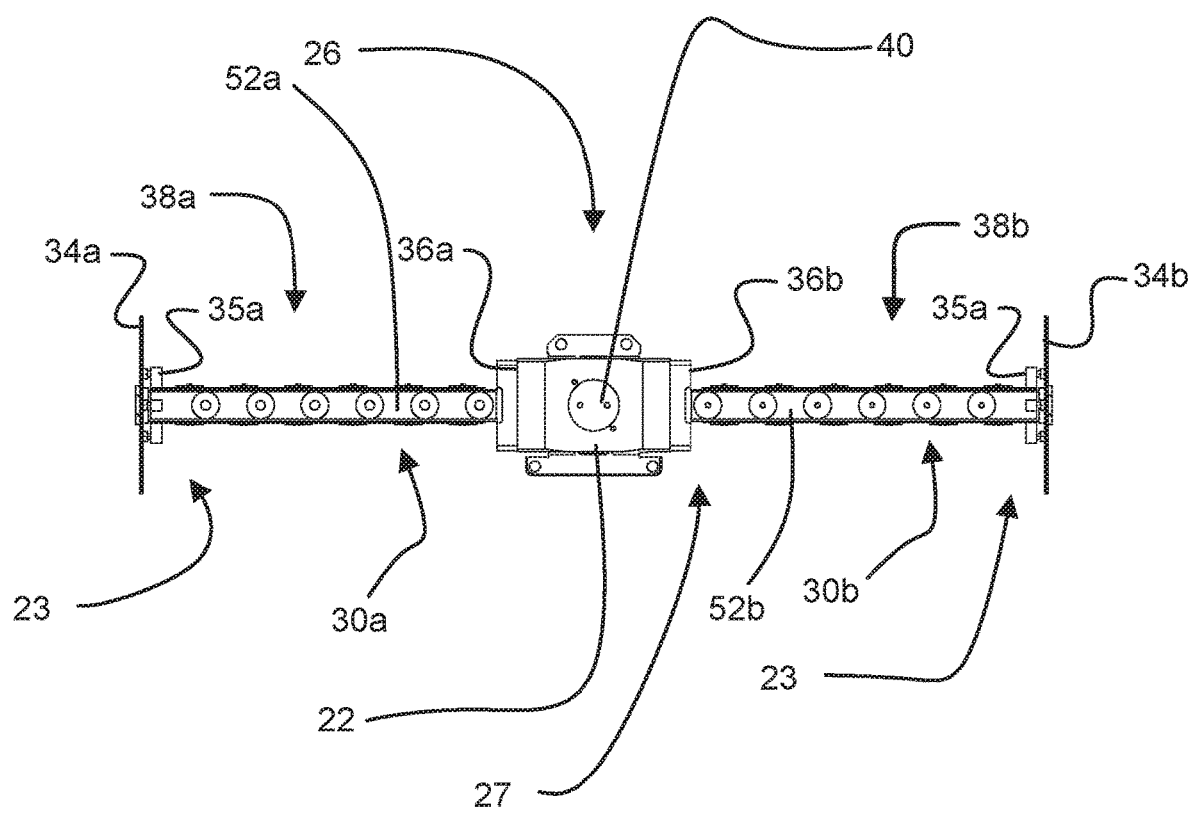
FIG. 5 illustrates a top view of the crossbar system shown in FIGS. 1 and 4 with the support structure not shown.
Figure 6:
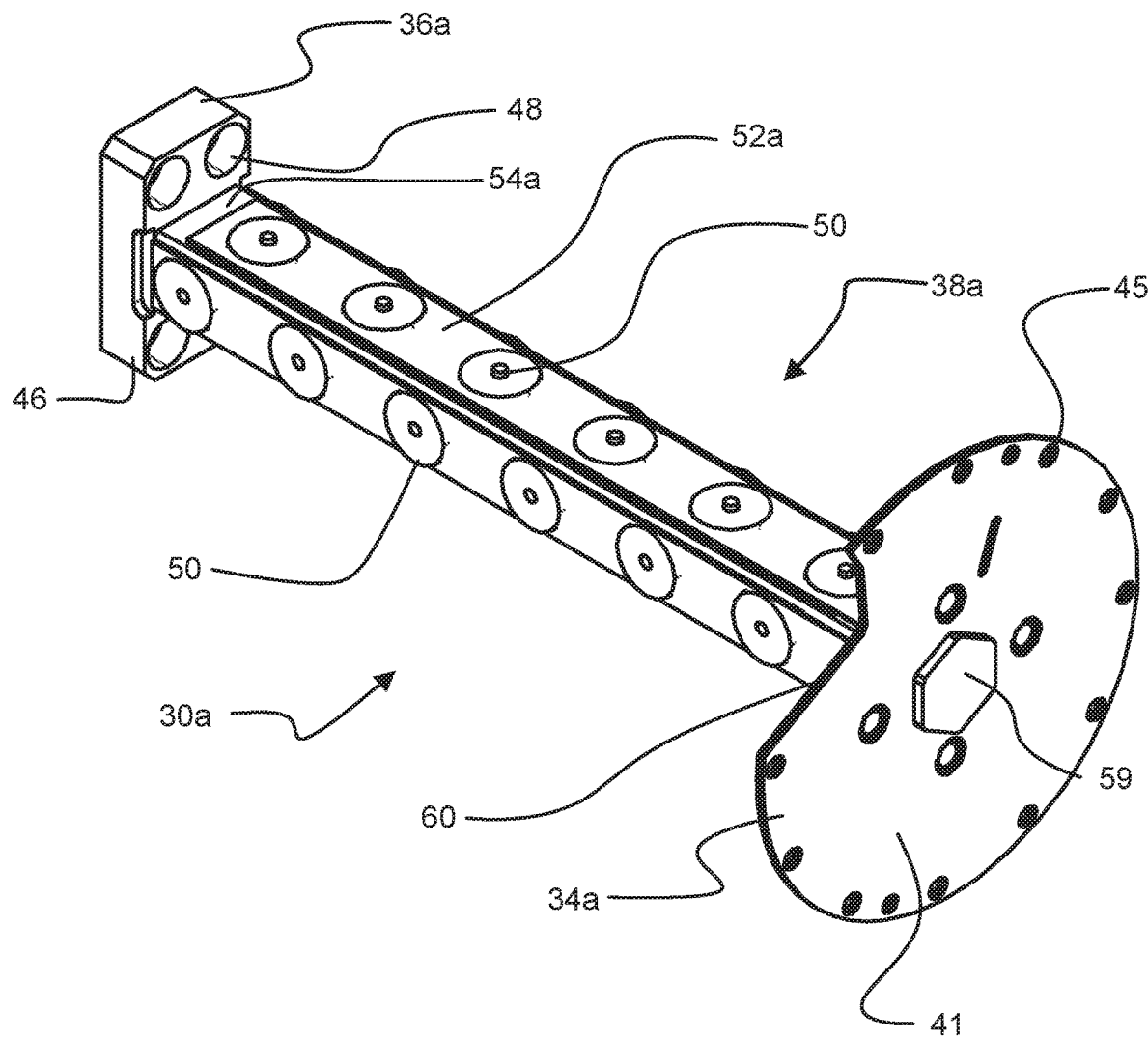
FIG. 6 illustrates an isometric view of a crossbar assembly of the crossbar system shown in FIGS. 1 and 4.

FIG. 5 illustrates the crossbar system 26 of FIG. 4 separated from the first and second portions 28a, 28b of the support structure. In the example shown, the crossbar system 26 comprises a first crossbar assembly 30a, a second crossbar assembly 30b, and a payload mount 22. With reference to FIGS. 5 and 6, the first crossbar assembly 30a comprises a crossbar segment 54a and a slip plate damper 52a. The crossbar segment 54a comprises a payload mount interface 36a at a proximal end 27 of the first crossbar assembly 30a, and a first structure interface 34a at a distal end 23 of the first crossbar assembly 30a. The slip plate damper 52a is disposed about the crossbar segment 54a, and, as will be described below, the slip plate damper 52a is slidably coupled to the crossbar segment 54a to constrain movement between the crossbar segment 54a and the slip plate damper 52a in two lateral degrees of freedom, and to facilitate movement between the crossbar segment 54a and the slip plate damper 52a in a longitudinal degree of freedom.

The slip plate damper 52a comprises a second support structure interface 35a at the distal end 23 of the second crossbar assembly 30b. The crossbar segment 54b comprises a payload mount interface 36b at a proximal end 27 of the crossbar assembly 30b, and a structure interface 34b (which can also comprise a flex plate) at a distal end 23 of the second crossbar assembly 30b. The slip plate damper 52b is disposed about the second crossbar segment 54b, and, as will be described below, the slip plate damper 52b is slidably coupled to the crossbar segment 54b to constrain movement between the crossbar segment 54b and the slip plate damper 52b in two lateral degrees of freedom and to facilitate movement between the crossbar segment 54a, 54b and the slip plate damper 52b in a longitudinal degree of freedom. The slip plate damper 52b comprises a second structure interface 35b at the distal end 23 of the second crossbar assembly 30b.

The payload mount 22 can be coupled to the payload mount interface 36a of the first crossbar assembly 30a, and to the payload mount interface 36b of the second crossbar assembly 30b. The payload mount 22 can comprise a spherical joint (e.g., see spherical joint 40) or other joint operable to mount or otherwise support a sensor assembly. In one example, the payload mount 22 can comprise a cardan joint, such as the cardan joint described in U.S. patent application Ser. No. 16/721,662, filed Dec. 19, 2019, which is incorporated by reference herein in its entirety, wherein the cardan joint can comprise a suspension interface yoke that physically couples to the payload mount interfaces 36a, 36b of the first and second crossbar assemblies 30a, 30b, respectively, and wherein the suspension interface yoke supports an inner assembly (e.g., a flexure, a payload interface assembly as part of a 3-axis gimbal, or others) that supports the sensor assembly (including the sensor). The payload mount 22 can enable the sensor assembly to adjust the positioning of a sensor relative to the coarse elevation platform 16. Thus, the coarse azimuth platform 14 and the coarse elevation platform 16 can provide coarse movement to the payload mount 22, which can enable the sensor assembly to make fine movements.

In some examples, the first crossbar assembly 30a and the second crossbar assembly 30b can be matching pairs having the same configuration, and that operate together to support, in a suspended state, the payload mount 22 (and the sensor assembly supported on the payload mount 22). For ease of discussion, the first crossbar assembly 30a of the crossbar system 26 will be described further with the understanding that the second crossbar assembly 30b can have the same configuration.

Figure 7:
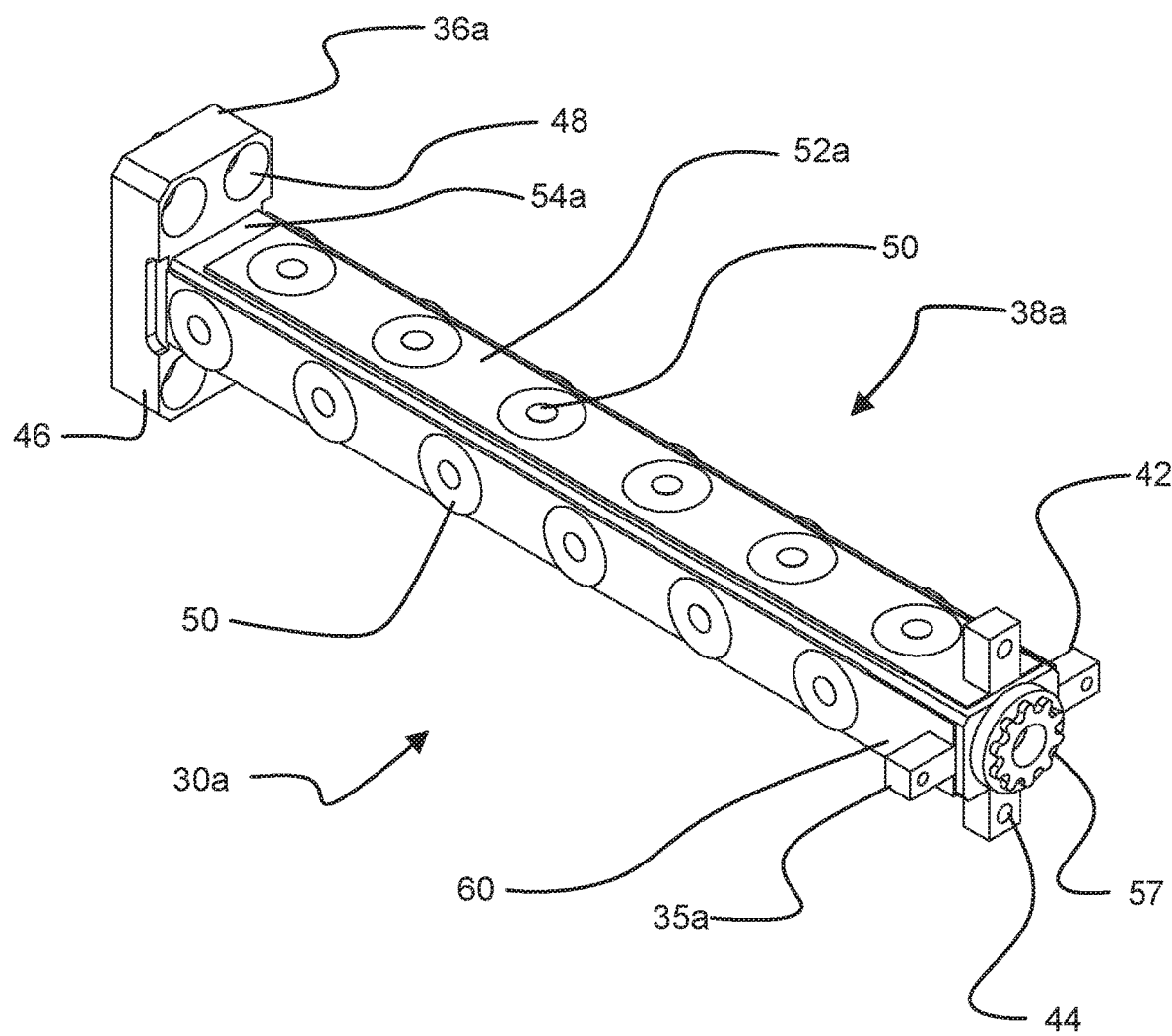
FIG. 7 illustrates an isometric view of the crossbar assembly shown in FIG. 6 with a flexplate removed.

FIG. 6 illustrates the first crossbar assembly 30a of FIG. 5 separate from the first portion 28a of the support structure and the payload mount 22. FIG. 7 illustrates the first crossbar assembly 30a as shown in FIG. 6, but with a flex plate 41 removed. The structure interface 34a is operable to mount to the support structure, such as first portion 28a of the support structure shown in FIG. 4. The first structure interface 34a can comprise the flex plate 41. The flex plate 41 can comprise various components and features, such as holes 45, which align with corresponding components and features of the support structure. The features of the flex plate 41 and the support structure can then be used to secure the flex plate 41 to the support structure. For example, the flex plate 41 can be secured to the support structure by threading a bolt (not depicted) through the holes 45 of the flex plate 41 and into a threaded aperture or socket of the support structure. The flex plate 41 can be resilient and enables the first crossbar assembly 30a to move relative to the support structure partially decoupling the first crossbar assembly 30a from the support structure. In some examples, the flex plate 41 comprises a sheet of spring steel.

The second support structure interface 35a can comprise radial extensions 42 (see FIG. 7). The radial extensions 42 can comprise components or features, such as holes 44 or threaded holes, that align with corresponding components or features of the support structure. The components or features of the radial extensions 42 and the support structure can then be used to secure the radial extensions 42 to the support structure. For example, the radial extensions 42 can be secured to the support structure by threading a bolt (not depicted) through the holes 44 of the radial extensions 42 and into a threaded aperture or socket of the support structure. As will be described below, the radial extensions 42 are coupled to slip plate dampers, which can dampen the movement of the first crossbar assembly 30a relative to the support structure.

The payload mount interface 36a is operable to couple to a payload mount, such as the payload mount 22 of FIG. 5. The payload mount interface 36a can comprise a flange 46 having features, such as holes 48 or threaded holes, that align with corresponding features of the payload mount 22. The features of the flange 46 may then be used to secure the first crossbar assembly 30a to the payload mount 22. For example, the payload mount can be secured to the payload mount interface 36a by threading a bolt (not depicted) through the holes 48 of the flange 46 and into a threaded aperture or socket of the payload mount 22.

Figure 8:
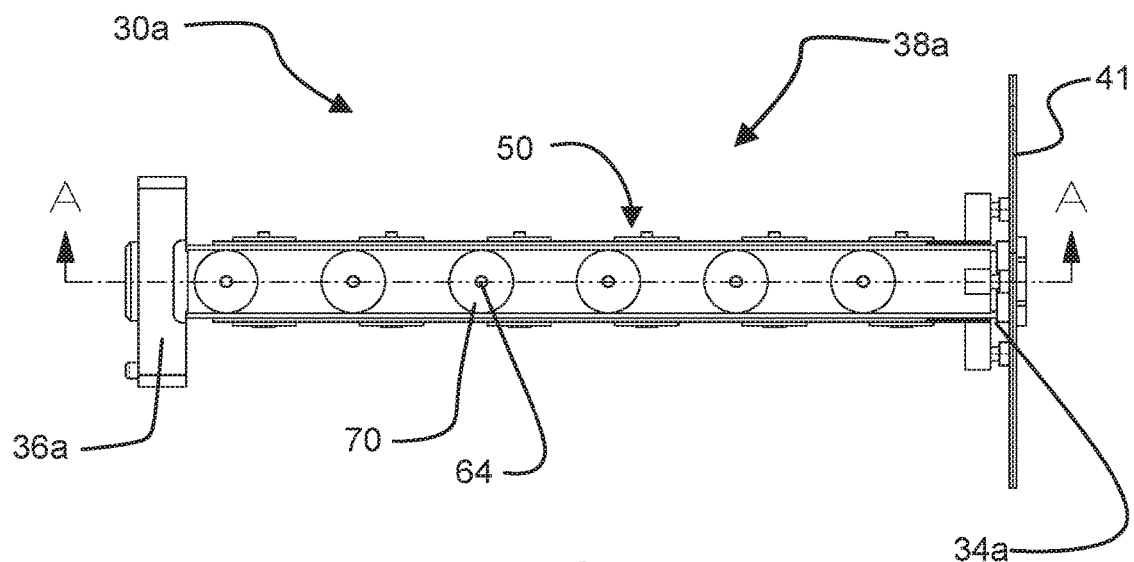
FIG. 8 illustrates a front view of the crossbar assembly shown in FIG. 6.
Figure 9:
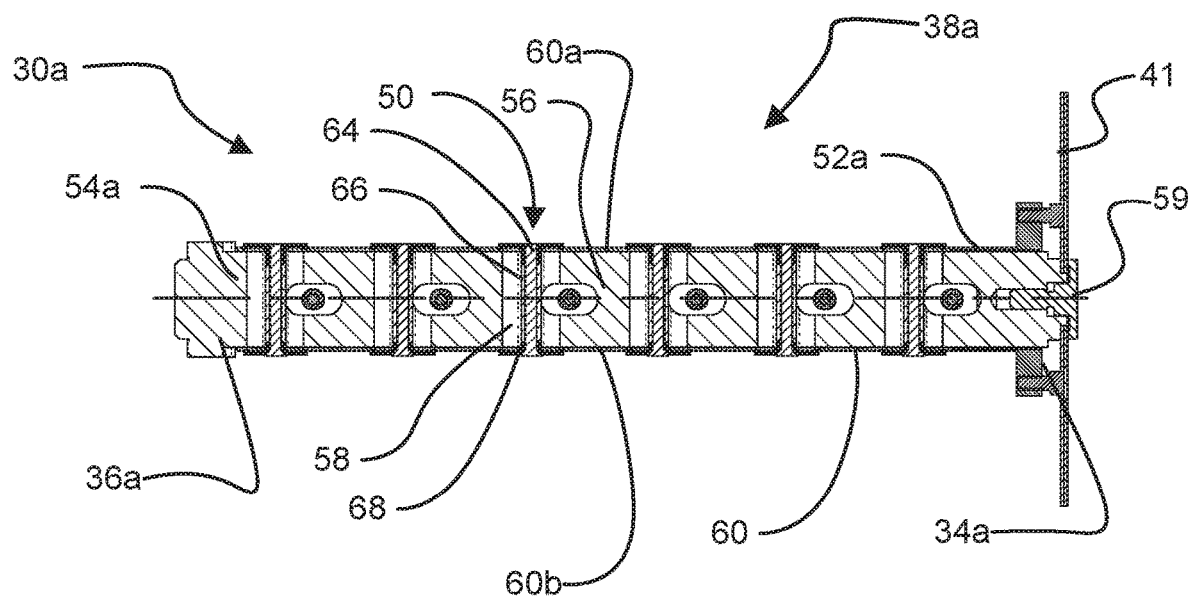
FIG. 9 illustrates a cross-sectional view of the crossbar assembly shown in FIG. 6 taken about line AA of FIG. 7.
Figure 10:
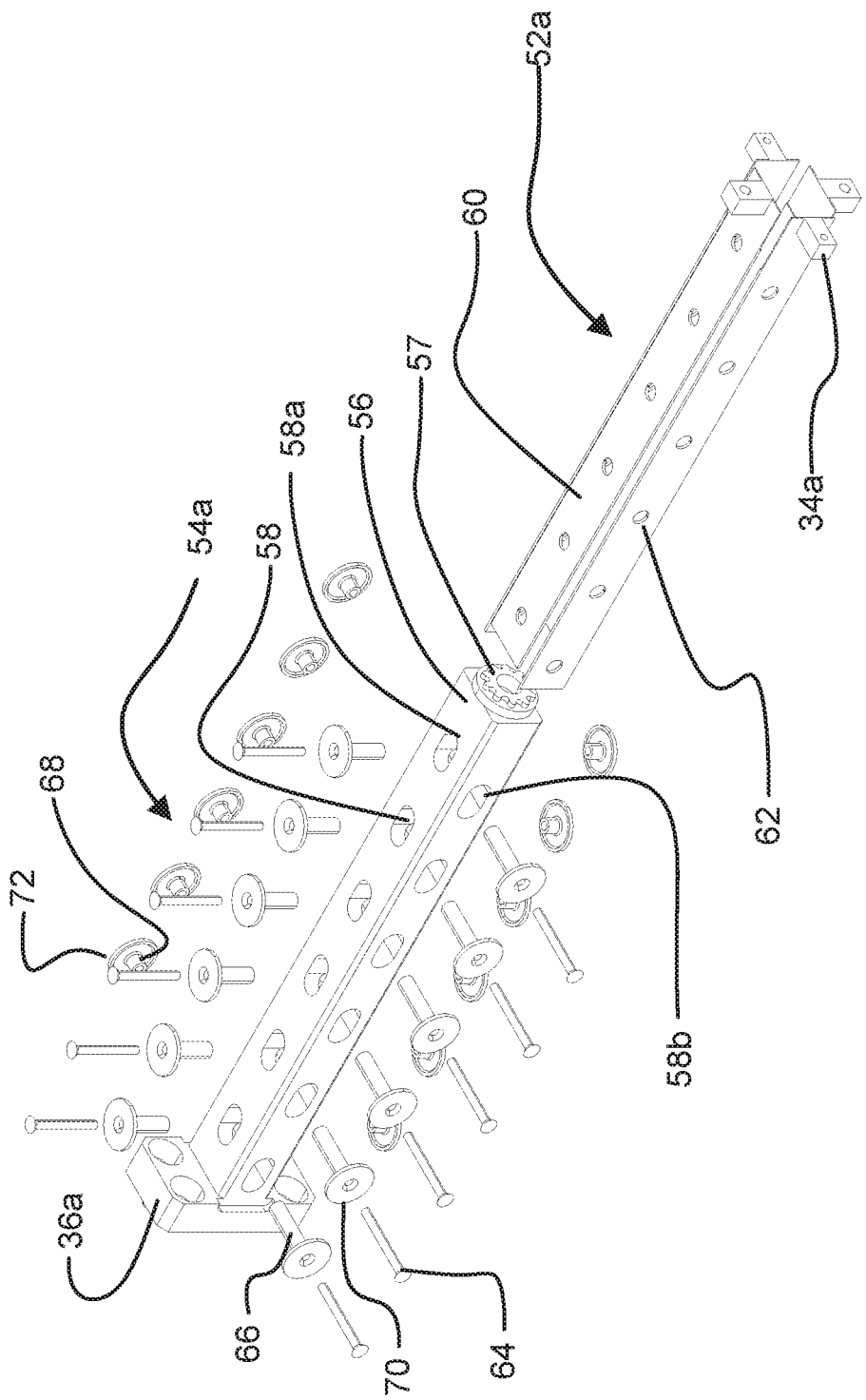
FIG. 10 illustrates an exploded view of the crossbar assembly shown in FIG. 6.

FIG. 8 illustrates the first crossbar assembly 30a of FIG. 6, FIG. 9 illustrates a cross section of the first crossbar assembly 30a of FIG. 6 taken about line AA of FIG. 8, and FIG. 10 illustrates an exploded view of the first crossbar assembly 30a of FIG. 6 with the flex plate 41 removed for clarity. With reference to FIGS. 8-10, and continued reference to FIGS. 1-7, the first crossbar assembly 30a comprises the slip plate damper 52a, the crossbar segment 54a, and fastener assemblies 50. In the example shown, which is not intended to be limiting in any way, the crossbar segment 54a can comprise an elongate bar 56 extending axially from the payload mount interface 36a to the first structure interface 34a. The elongate bar 56 can comprise slots 58 that pass radially through the elongate bar 56. The slots 58 can be elongate slots that have a longitudinal length that is greater than a lateral width of the slot 58. In some examples, the elongate bar 56 can have a square cross section with four lateral surfaces. The slots 58 pass radially from a lateral surface through the elongate bar 56 to an opposing lateral surface. The slots 58 can be axially spaced along elongate bar 56. Slots 58 on adjacent lateral surfaces can be axially offset from one another so that they do not intercept one another as they extend through the elongate bar 56. For example, slot 58a is laterally offset from slot 58b.

The elongate bar 56 can comprise an interface for coupling to the flex plate 41. In the example shown, which is not intended to be limiting in any way, the interface of the elongate bar 56 comprises a threaded socket and a keyed axial protrusion 57. The keyed axial protrusion 57 extends into a complementary keyed aperture of the flex plate 41. A fastener 59 may be threaded through the flex plate 41 and into the threaded socket to axially and mechanically couple the elongate bar 56 to the flex plate 41. The keyed axial protrusion 57 and the complementary keyed aperture function together to couple the rotation of the elongate bar 56 to the flex plate 41.

The slip plate damper 52a can comprise elongate slip plates 60 that extend axially from the radial extensions 42 towards the payload mount interface 36a. Each of the elongate slip plates 60 can comprise holes 62 that pass through the elongate slip plates 60. The holes 62 of the elongate slip plates 60 can be formed in a position so as to complement or align with the slots 58 of the elongate bar 56 of the crossbar segment 54a. In other words, the holes 62 of the elongate slip plates 60 can have the same spacing as the slots 58 of the elongate bar 56, such that when an elongate slip plate 60 is positioned adjacent a lateral surface of the elongate bar 56, the holes 62 align with the slots 58 of the elongate bar 56. Thus, a fastener assembly 50 passing through a hole 62 of an elongate slip plate 60 will pass into a corresponding slot 58 of the elongate bar 56.

The fastener assemblies 50 can comprise a threaded fastener, such as a bolt or screw and a threaded sleeve for receiving the threaded fastener. In the example of FIGS. 5-9, each fastener assembly 50 comprises a screw 64, a spacer 66, and a threaded sleeve 68. The spacer 66 and the threaded sleeve 68 each have an enlarged head 70, 72, respectively, that is wider than a diameter of the holes 62 of the elongate slip plate 60. In some examples, the enlarged heads 70, 72 may have a conical shape similar to a Belleville spring. In other examples, a spring washer, such as a Belleville spring may be included adjacent the enlarged heads 70, 72. Together, the spacer 66 and the threaded sleeve 68 may have a total length between each respective enlarged head 70, 72 that is slightly larger than the width of the elongate bar 56 and the thickness of opposing elongate slip plates 60. Thus, when the spacer 66 and the threaded sleeve 68 are inserted through the elongate slip plates 60 and the elongate bar 56, a spring portion (the outer edge of the conical shape) of the enlarged heads 70, 72, or any spring washer will contact the elongate slip plates 60 biasing the elongate slip plates 60 towards one another.

The spacer 66 and the threaded sleeve 68 can each have an external diameter that complements an internal diameter of the holes 62 of the elongate slip plates 60. For example, the external diameter of the spacer 66 and the threaded sleeve 68 may be slightly smaller than the internal diameter of the holes 62 such that the spacer 66 and the threaded sleeve 68 can pass through a hole 62 without substantial effort, but fit tightly enough that there is substantially no lateral movement of the spacer 66 and threaded sleeve 68 within the hole 62. The slots 58 can have a minor, lateral width substantially similar to the diameter of the holes 62 such that the spacer 66 and the threaded sleeve 68 pass through the slot 58 without substantial effort, but are substantially unable to move laterally in the slot 58. The major, longitudinal length of the slot 58 can be greater than the diameter of the spacer 66 and the threaded sleeve 68 such that the spacer 66 and threaded sleeve 68 can translate longitudinally in the slot 58. The screw 64 couples the spacer 66 and the threaded sleeve 68 together within the slot 58, Thus, when inserted into a slot 58 and coupled together by the screw 64, the spacer 66 and the threaded sleeve 68 are constrained from movement in two lateral degrees of freedom but can move longitudinally relative to the elongate bar 56.

When assembled, the elongate slip plates 60 are positioned adjacent the elongate bar 56 with the holes 62 of the elongate slip plates 60 aligned with respective slots 58 of the elongate bar 56. The spacer 66 is posited in a hole 62 of a first elongate plate 60a and extends into a slot 58 of the elongate bar 56. The threaded sleeve 68 is positioned in a complementary hole 62 of a second elongate plate 60b and extends into the slot 58 of the elongate bar 56 contacting the threaded sleeve 68. The screw 64 passes through the spacer 66 and threads into the threaded sleeve 68. A head of the screw 64 contacts the enlarged head 70 of the spacer 66 and provides a bias force between the spacer 66 and the threaded sleeve 68. The spring portions of the threaded sleeve 68 and the spacer 66 bias the elongate plates 60a, 60b toward the outer surface of the elongate bar 56, coupling the elongate plates 60a, 60b to the elongate bar 56 laterally. The coupling of the elongate plates 60a, 60b to the elongate bar 56 inhibits movement of the elongate plates 60a, 60b relative to the elongate bar 56 in a direction normal to the outer surface of the elongate bar 56 and laterally as the spacer 66 and the threaded sleeve 68 contact the inner walls of the slot 58 of the elongate bar 56. However, the elongate slip plates 60 are able to move longitudinally relative to the elongated bar 56 as the spacer 66 and the threaded sleeve 68 move longitudinally in the slot 58. Frictional forces between the elongate plates 60a, 60b and the elongate bar 56 inhibit the longitudinal movement of the elongate bar 56 relative to the elongate slip plates 60 and the structure to which the elongate slip plates 60 are coupled, thus dampening movement of a sensor assembly supported on the payload mount. The flex plate 41 partially decouples movement of the first crossbar assembly 30a from the structure, while the elongate plates dampen vibrations acting on the sensor assembly.

The amount of damping provided by the first crossbar assembly 30a may be varied, or tuned, by changing the amount of friction between the slip plate damper 52 and the crossbar segment 54a as provided by the preload forces attaching them to the crossbar segment 54a. For example, as friction is increased between the slip plate damper 52a and the crossbar segment 54a, the first crossbar assembly 30a behaves increasingly like a critically damped crossbar. As the friction between the slip plate damper 52a and the crossbar segment 54a is reduced, the slip plate damper 52a and the crossbar segment 54a will more readily move relative to one another lowering the damping ratio of the mounted sensor and sensor assembly. The amount of friction between the crossbar segment 54 and the slip plate damper 52a may be varied to increase or decrease the friction between the slip plate damper 52a and the crossbar segment 54a to tune the damping of the first crossbar assembly 30a as needed or desired. For instance, the friction may be varied by changing the surface area between the crossbar segment 54a and the slip plate damper 52a, changing the bias provided by the fastener assemblies 50, such as by using a spring washer with a different spring constant, thereby changing the normal force between the slip plate damper 52a and the crossbar segment 54a, changing the coefficient of friction between the crossbar segment 54a and the slip plate damper 52a, or other techniques as will be recognized by those skilled in the art. These same tuning functions can be accomplished in the second crossbar assembly 30b Moreover, tuning of the resonant frequency of the suspension achieved by the first and second crossbar assemblies 30a and 30b can be accomplished by changing or varying the geometry and/or dimensions of the crossbar segments 54a and 54b. For example, tuning of or within the first crossbar assembly 30a can be accomplished by changing the dimensions of the cross-section of the crossbar segment 54a (e.g., the rectangular cross-section of the elongate bar 56). Specifically, varying the height of the cross-section of the crossbar segment 54a functions to affect and vary the vertical frequency. Varying the depth of the crossbar segment 54a functions to affect and vary the longitudinal frequency. Furthermore, varying the thickness of the first structure interface 34a (e.g., the flex plate 41) functions to affect and vary the lateral frequency within the crossbar assembly 30a, Again, these same tuning functions can be accomplished in the second crossbar assembly 30b.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A crossbar system for isolating of a sensor assembly from external vibrations of a support structure, the crossbar system comprising:
   first and second crossbar assemblies, each comprising:
      a crossbar segment comprising a payload mount interface at a first end of the crossbar assembly and a first support structure interface at a second end of the crossbar assembly opposing the first end;
      a slip plate damper disposed about the crossbar segment and slidably coupled to the crossbar segment to constrain movement in two lateral degrees of freedom and to facilitate movement in a longitudinal degree of freedom, the slip plate damper comprising a second support structure interface at the second end of the crossbar assembly; and
   a payload mount coupled to the payload mount interfaces of the first and second crossbar assemblies, the payload mount operable to support a sensor assembly.

2. The crossbar system of claim 1, wherein each crossbar assembly further comprises a flexible plate supported by the respective crossbar segment of each crossbar assembly, wherein the flexible plate defines the support structure interface of each crossbar segment.

3. The crossbar system of claim 1, wherein each slip plate damper comprises a plurality of elongate plates extending from the second support structure interface, and wherein the crossbar segment comprises an elongate bar extending between the payload mount interface and the second support structure, wherein the plurality of elongate plates are arranged about the elongate bar.

4. The crossbar system of claim 3, wherein each of the elongate plates of the plurality of elongate plates comprises a plurality of axially spaced holes, and wherein the elongate bar comprises a plurality of axially spaced slots corresponding to the plurality of axially spaced holes of an elongate plate.

5. The crossbar system of claim 4, wherein each crossbar assembly further comprises a plurality of fasteners biasing each of the elongate plates towards the elongate bar.

6. The crossbar system of claim 3, wherein the elongate bar has a length greater than a length of each of the plurality of elongate plates.

7. A crossbar assembly for facilitating isolation of a sensor assembly from external vibrations of a payload system mount on a vehicle, the crossbar assembly comprising:
a crossbar segment comprising a payload mount interface at a first end of the crossbar assembly and a first support structure interface at a second end of the crossbar assembly opposing the first end; and
a slip plate damper disposed about the crossbar segment and slidably coupled to the crossbar segment to constrain movement in two lateral degrees of freedom and to facilitate movement in a longitudinal degree of freedom, the slip plate damper comprising a second support structure interface at the second end of the crossbar assembly,
wherein the first support structure interface facilitates longitudinal movement of the crossbar segment relative to a support structure, and
wherein the second support structure interface dampens movement of the crossbar segment relative to the support structure.

8. The crossbar assembly of claim 7, further comprising a flexible plate supported by the crossbar segment, the flexible plate defining the support structure interface.

9. The crossbar assembly of claim 7, further comprising at least one fastener, wherein the crossbar segment further comprises a plurality of axially spaced slots and the slip plate damper further comprises a corresponding plurality of holes, and each fastener extends through a hole of the plurality of holes and a corresponding slot of the plurality of axially spaced slots.

10. The crossbar assembly of claim 7, wherein the crossbar segment comprises an elongate bar and the slip plate damper comprises a plurality of elongate plates.

11. The crossbar assembly of claim 10, wherein the elongate bar has a square cross section and the plurality of elongate plates comprises four elongate plates.

12. The crossbar assembly of claim 11, wherein the second support structure interface comprises a lateral extension of an elongate plate of the plurality of elongate plates.

13. The crossbar assembly of claim 8, wherein the crossbar segment comprises an axial protrusion configured to interface with a complementary aperture of the flexible plate.

14. The crossbar assembly of claim 13, wherein the axial protrusion has a keyed profile and the aperture has a complementary keyed profile that facilitates rotational coupling of the crossbar segment and the flexible plate.

15. The crossbar assembly of claim 7, wherein the slip plate damper is slidably coupled to the crossbar segment using at least one fastener operable to bias the slip plate damper towards the crossbar segment.

16. A payload system mount comprising:
a base structure;
a support structure rotatably coupled to the base structure;
a crossbar system supported by the support structure, the crossbar system comprising:
a payload mount;
first and second crossbar assemblies, each comprising:
a crossbar segment comprising a payload mount interface at a first end of the crossbar assembly and a first support structure interface at a second end of the crossbar assembly opposing the first end;
a slip plate damper disposed about the crossbar segment and slidably coupled to the crossbar segment to constrain movement in two lateral degrees of freedom and to facilitate movement in a longitudinal degree of freedom, the slip plate damper comprising a second support structure interface at the second end of the crossbar assembly; and
a sensor assembly coupled to the payload mount, the sensor assembly comprising at least one sensor.

17. The payload system mount of claim 16, wherein each crossbar assembly further comprises a flexible plate supported by the crossbar segment, the flexible plate defining the support structure interface.

18. The payload system mount of claim 16, wherein each first slip plate damper comprises a plurality of elongate plates extending from the second support structure interface and the crossbar segment comprises an elongate bar extending from the first payload mount interface, wherein the plurality of elongate plates are arranged about the elongate bar.

19. The payload system mount of claim 18, wherein each of the elongate plates of the plurality of elongate plates comprise a plurality of axially spaced holes and the elongate bar comprises a plurality of axially spaced slots corresponding to the plurality of axially spaced holes of an elongate plate.

20. The payload system mount of claim 19, wherein each crossbar segment further comprises a plurality of fasteners biasing each of the elongate plates towards the elongate bar.

* * * * *